United States Patent

Murata et al.

Patent Number: 5,965,987
Date of Patent: *Oct. 12, 1999

[54] APPARATUS FOR SUPPRESSING ELECTRIC FIELD RADIATION FROM A CATHODE RAY TUBE

[75] Inventors: Takashi Murata; Yuichi Kunita, both of Ishikawa, Japan

[73] Assignee: Nanao Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,890

[22] Filed: Nov. 13, 1996

[30] Foreign Application Priority Data

Nov. 15, 1995 [JP] Japan ................................ 7-296595

[51] Int. Cl.⁶ ................................................ H01J 29/06
[52] U.S. Cl. .................................................. 315/85; 315/8
[58] Field of Search ................................ 315/8, 85, 364, 315/370; 313/430, 421

[56] References Cited

U.S. PATENT DOCUMENTS

| | | | |
|---|---|---|---|
| 5,151,635 | 9/1992 | Cappels | 315/370 |
| 5,260,626 | 11/1993 | Takase et al. | 315/85 |
| 5,382,875 | 1/1995 | Grocki et al. | 315/8 |
| 5,396,151 | 3/1995 | Cappels | 315/8 |
| 5,404,084 | 4/1995 | Onodera et al. | 315/370 |

FOREIGN PATENT DOCUMENTS

| | | |
|---|---|---|
| 0630036 | 12/1994 | European Pat. Off. . |
| 0727806 | 8/1996 | European Pat. Off. . |
| 61-142869 | of 1986 | Japan . |
| 2-79673 | of 1990 | Japan . |
| 3102971 | of 1991 | Japan . |
| 3217171 | of 1991 | Japan . |
| 3240370 | of 1991 | Japan . |
| 4-45668 | of 1992 | Japan . |
| 4315741 | of 1992 | Japan . |
| 6253165 | of 1994 | Japan . |
| 6289801 | of 1994 | Japan . |
| 7142008 | of 1995 | Japan . |
| 7288709 | of 1995 | Japan . |
| 7298169 | of 1995 | Japan . |
| 8227666 | of 1996 | Japan . |
| 2273230 | 6/1994 | United Kingdom . |

OTHER PUBLICATIONS

Office Action Issued by the Japanese Patent Office on Feb. 9, 1999 in the Corresponding Japanese Application.

*Primary Examiner*—Don Wong
*Assistant Examiner*—David H. Vu
*Attorney, Agent, or Firm*—Ostrolenk, Faber, Gerb & Soffen, LLP

[57] ABSTRACT

An anode ripple voltage waveform is detected by a capacitor built into a flyback transformer. The detected waveform is then phased by a phasing circuit, amplitude adjusted by an amplitude adjusting circuit and subsequently delivered to an addition circuit. A horizontal component is detected by a horizontal output transformer, then phase adjusted by a phasing circuit and subsequently amplitude adjusted by an amplitude adjusting circuit. Thereafter, the horizontal component is added to the anode ripple component by the addition circuit, inverted and amplified by an inverting amplifier, and then supplied to an antenna arranged in proximity to the cathode ray tube. Thus, electric fields radiated from the face of the cathode ray tube are suppressed.

5 Claims, 6 Drawing Sheets

HORIZONTAL SYNCHRONIZATION

INFLUENCE OF NOISES WITHIN FLYBACK TRANSFORMER

PARABOLA FOR DYNAMIC FOCUSING

APPARATUS FOR SUPPRESSING ELECTRIC FIELD RADIATION FROM A CATHODE RAY TUBE

BACKGROUND OF THE INVENTION

1. Field of the Invention

The present invention relates to an apparatus for suppressing electric field radiation from a cathode ray tube used in a Visual Display Terminal (hereinafter referred to VDT) in a computer system.

2. Description of the Background Art

It has been recognized that the electric field radiation from a VDT, particularly that in the range from 5 Hz to 400 kHz adversely affects human health. According to the MPR standards (MPR 1990) in Sweden, for example, alternating electric fields (AEF) are regulated so as not to exceed 25 V/m and 2.5 V/m in the ranges from 5 Hz to 2 kHz and 2 kHz to 400 kHz, respectively. Regarding TCO standards, electric fields are regulated so as not to exceed 10 V/m and 1 V/m in the ranges from 5 Hz to 2 kHz and 2 kHz to 400 kHz, respectively.

Electric fields radiated from a VDT are largely caused by the flyback pulses of horizontal deflection, and such electric fields are generated mainly from a deflection yoke mounted on the cathode ray tube. The electric fields caused by flyback pulses of horizontal deflection are within a relatively high frequency domain as described above. Other than those caused by the flyback pulses of horizontal deflection as described above, the VDT also radiates electric fields caused by high voltages applied to the anode of the cathode ray tube. These voltages fluctuate in synchronization with the vertical field. The electric fields caused by voltage fluctuations in the vertical field are observed in a relatively low frequency domain in the above-described frequency range.

Such electric field radiation from portions other than the front surface of the cathode ray tube can be effectively shielded by a shielding device such as a metal plate, for example. At the front of the cathode ray tube, where images are visually displayed, such shielding by the metal plate cannot be simply applied.

Meanwhile, in order to prevent the front surface of the cathode ray tube from becoming charged due to the high voltage striking the cathode ray tube surface and thus attracting dust from the air, a transparent conductive film is formed either on the front surface of the cathode ray tube or on a transparent panel bonded to the front of the cathode ray tube and grounded. Such a film has a shielding effect to some extent, but applying the film can be costly.

U.S. Pat. No. 5,260,626, for example, discloses an apparatus for suppressing such electric field radiation of horizontal components. Using the apparatus, a pulse obtained from a horizontal transformer or the like (such as flyback transformer and deflection yoke) is inverted in polarity, shaped and amplified into a waveform very close to the waveform of radiation but of opposite polarity. Regarding the vertical component, a pulse is also obtained by resistor-diving the anode voltage. This pulse is also shaped and amplified such that its shape is very close to that if the waveform of vertical radiation but is again of opposite polarity. The radiation of electric fields (both horizontal and vertical) is then suppressed by applying these opposite polarity pulses to a degaussing coil mounted at the front of the cathode ray tube.

According to another method described in U.S. Pat. No. 5,151,635, a sensor, such as an electrode plate, is attached in proximity to a cathode ray tube. Electric fields radiated from the cathode ray tube are directly detected by the sensor. The detection signal is inverted, then amplified and supplied to an antenna mounted around the cathode ray tube which again causes suppression of the electric field radiation.

Among the two aforementioned methods, the first method sufficiently satisfies MPR-II according to the AEF standards, but more precise detection waveforms for cancellation are required in order to satisfy TCO standards. More specifically, the first method of canceling electric fields by resistor-dividing the anode voltage requires that the detection resistance be several hundred MΩ or higher, which degrades the frequency characteristic and causes difficultly in accurately producing display picture components. Furthermore, noises within the flyback transformer may be detected as well.

Regarding the second method, positional deviation errors of either the sensor of radiation from the antenna, will impede the electric fields from being accurately detected, and canceled. The setup needed for this method is also complicated.

SUMMARY OF THE INVENTION

An object of the invention is to provide an apparatus for suppressing electric field radiation from a cathode ray tube, which is capable of detecting unwanted radiation of electric fields with high accuracy and minimizing the electric field radiation.

Briefly stated, the apparatus for suppressing electric field radiation from a cathode ray tube, according to the present invention, includes a capacitor for detecting anode ripple voltage contained in high voltage output from a flyback transformer, an output circuit for inverting and amplifying the detected anode ripple voltage, and an antenna for permitting the cathode ray tube to radiate electric fields for canceling the electric field radiation based on a signal output from the output circuit. The apparatus thus positively cancels the unwanted electric field radiation.

In a preferred embodiment of the invention, a phasing/amplitude adjusting circuit for adjusting the phase and amplitude of the anode ripple voltage detected by the capacitor, and an inverting amplifier circuit for inverting and amplifying an output signal from the phasing/amplitude adjusting circuit are provided, and electric fields used for canceling are adjusted to coincide in phase and amplitude with the electric fields radiated from the front face of the cathode ray tube.

In a further preferred embodiment of the invention, a horizontal phasing/amplitude adjusting circuit for adjusting the phase and amplitude of a horizontal signal from a horizontal output transformer for application to the inverting amplifier circuit together with the output of the phasing/amplitude adjusting circuit is provided, and electric field radiation caused by horizontal components as well as high voltage fluctuating components is suppressed.

In yet another preferred embodiment of the invention, a first capacitor for outputting high voltage output from the flyback transformer and a second capacitor connected in parallel with the first capacitor are provided, and anode ripple voltage is output from the second capacitor.

In still another preferred embodiment of the invention, the antenna includes an electrode provided in proximity to the cathode ray tube.

In an additional preferred embodiment of the invention, the first capacitor is provided coaxially around the second capacitor, and the first capacitor functions as shielding for the second capacitor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Before describing preferred embodiments of the invention, the causes of electric fields radiated from the front face of the cathode ray tube will be detailed.

Figure 3A:
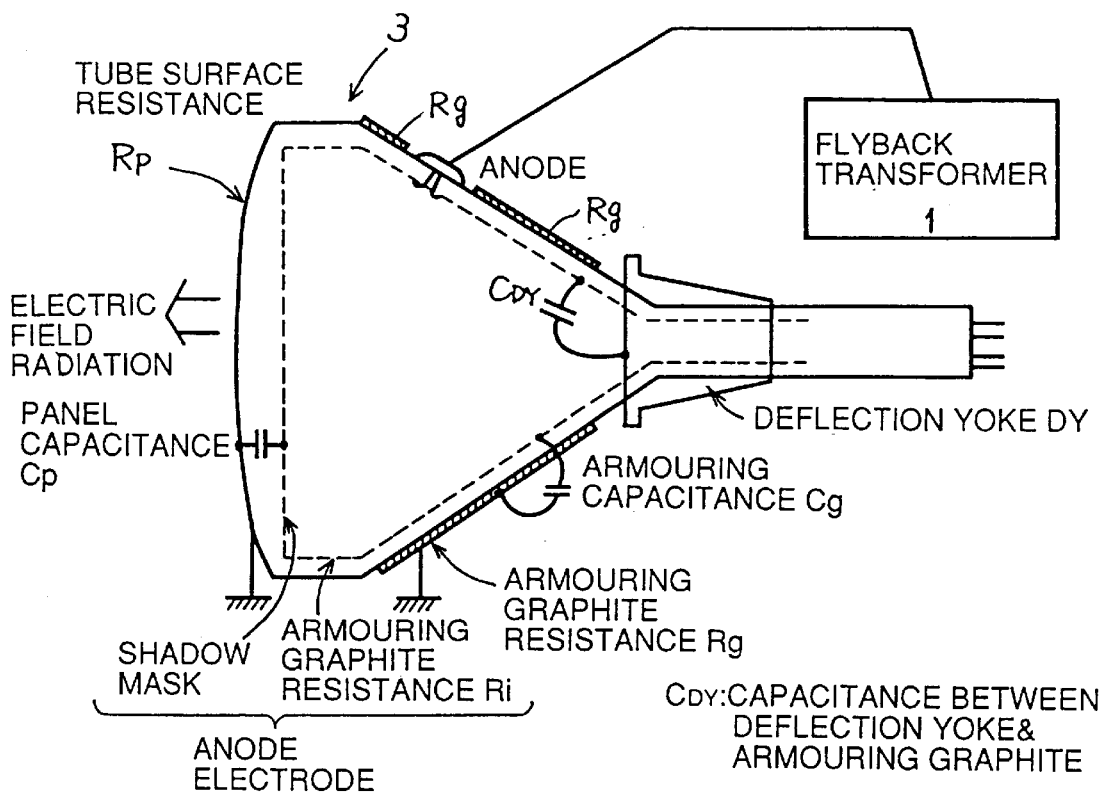
FIGS. 3A and 3B are representations for use in illustration of electric fields radiated from the front face of a cathode ray tube.
Figure 3B:
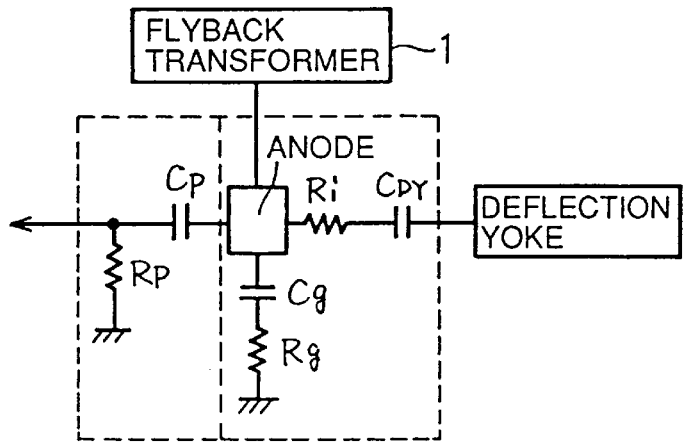

FIG. 3A is a view showing elements giving rise to electric field radiation from the cathode ray tube and resistance and capacitance associated with these elements, and FIG. 3B is an equivalent circuit diagram of FIG. 3A. In FIG. 3A, electric fields radiated from cathode ray tube 3 including those resulting from horizontal pulses from a deflection yoke DY are passed through a low pass filter formed of capacitance $C_{DY}$, inner graphite resistance $R_i$, armouring capacitance $C_g$, and armouring graphite resistance $R_g$ and through a high pass filter of panel capacitance $C_p$ and tube surface resistance $R_p$, and those electric fields resulting from high voltage fluctuating components from flyback transformer 1 and passed through a high pass filter.

Among the electric fields radiated from cathode ray tube 3, those radiated from the front surface through the anode are difficult to suppress as shown in FIGS. 3A and 3B. An anode electrode 4 formed of the anode, the inner graphite and a shadow mask, which is an electrode closest to the front surface of the cathode ray tube, functions as optimum means for detecting ripple voltage applied to anode electrode 4. A capacitor is preferably used that exhibits a good frequency characteristic and is capable of readily detecting such voltage.

Figure 1:
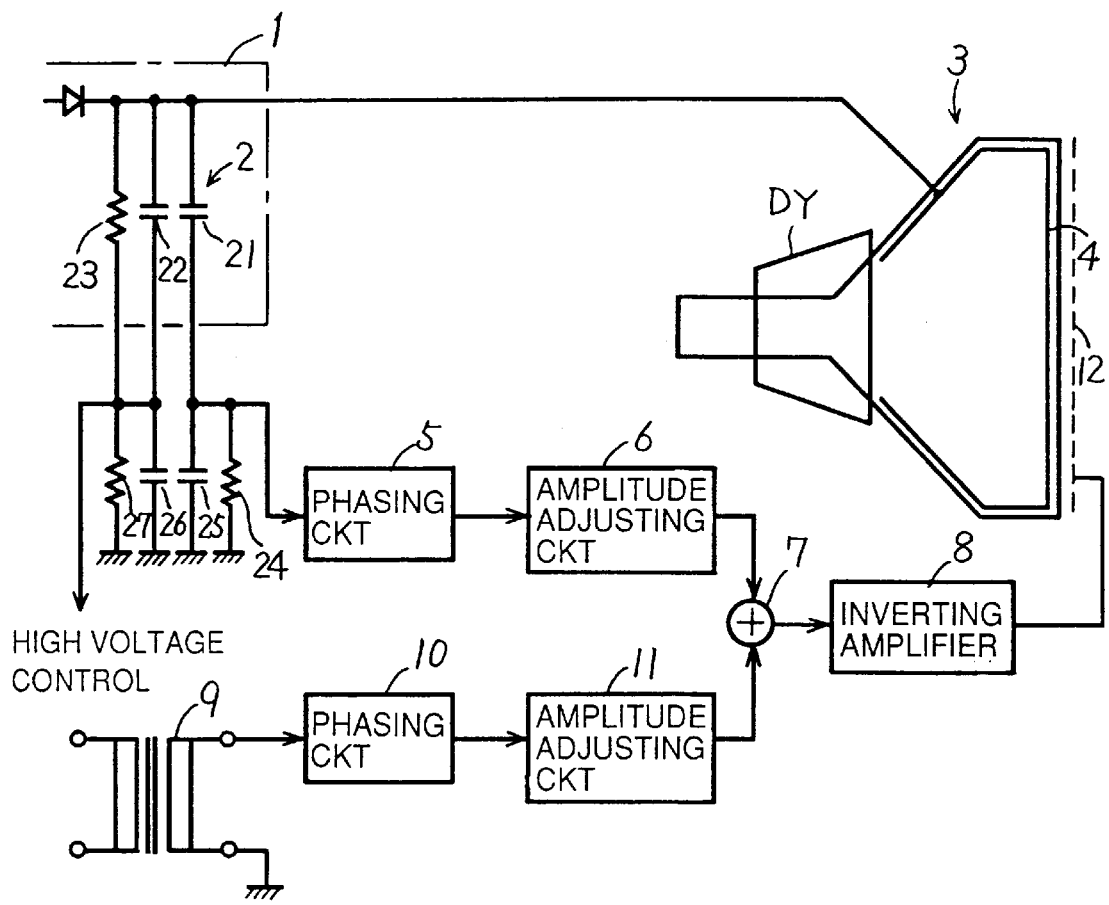
FIG. 1 is a block diagram showing an embodiment of the invention.
Figure 2A:
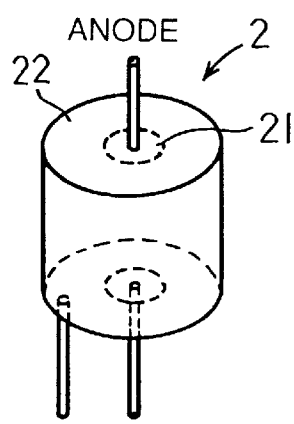
FIGS. 2A and 2B show more specifically the capacitor in FIG. 1 by way of illustration.
Figure 2B:
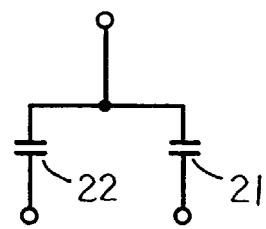

FIG. 1 is a block diagram showing an embodiment of the invention, and FIGS. 2A and 2B are representations showing a high voltage capacitor in a flyback transformer.

In FIG. 1, flyback transformer 1 has a capacitor 2 built therein. As shown in FIG. 2A, capacitor 2 includes a capacitor 22 for controlling high voltage which is configured coaxially around a capacitor 21 and connected in parallel with capacitor 21. High voltage control capacitor 22 is grounded through a parallel arrangement of a capacitor 26 and a resistor 27, and capacitor 21 is grounded through a parallel arrangement of a resistor 24 and a capacitor 25. Thus connecting high voltage control capacitor 22 and capacitor 21 in parallel permits ripple voltage generated on anode electrode 4 to be directly monitored, so that the detection waveforms for canceling electric fields can be accurately produced. Thus, high voltage control capacitor 22 and capacitor 21 are individually provided and connected in parallel, which increases the tan δ and ESR of capacitors, and thus high frequency impedance characteristic are greatly improved. In addition, outer high voltage control capacitor 22 functions as electric field shielding for capacitor 21.

Figure 4:
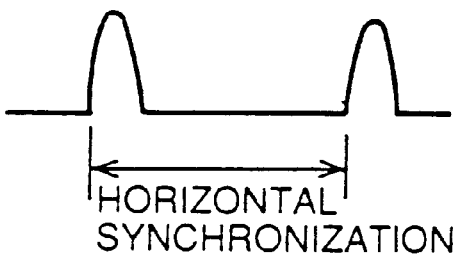
FIG. 4 illustrates how an outer voltage control capacitor shields an inner capacitor for electric field cancellation.
Figure 4:
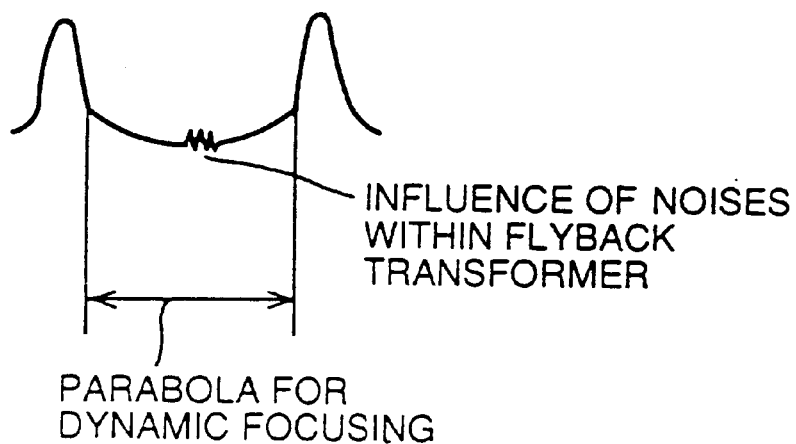

FIG. 4 depicts how outer high voltage control capacitor 22 shields capacitor 21. In capacitor 2, if high voltage control capacitor 22 is arranged inside and coaxially with capacitor 21, or if the capacitors 21 and 22 are not arranged coaxially, a waveform detected by capacitor 21 is affected by both the parabola voltage for dynamic focusing and noises within the flyback transformer as shown in FIG. 4(b).

By contrast, when high voltage control capacitor 22 is arranged outside and coaxially with capacitor 21, a waveform detected by capacitor 21 is less affected by the parabola voltage for dynamic focusing and from noises within the flyback transformer as shown in FIG. 4(a). Thus, outer high voltage control capacitor 22 functions as an electric field shielding for inner capacitor 21.

Now, the operation of the circuit shown in FIG. 1 will be described. The waveform of anode ripple voltage, i.e., a high voltage fluctuating component including the horizontal, front display and vertical components, is extracted from capacitor 21 and applied to a phasing circuit 5 for phasing, and the resulting signal is applied to an amplitude adjusting circuit 6 and has its amplitude adjusted to be applied to an addition circuit 7. Phasing circuit 5 and amplitude adjusting circuit 6 mainly adjust the display component and the vertical component.

Meanwhile, the horizontal component portion, which has not been sufficiently adjusted by the phasing circuit 5 and amplitude adjusting circuit 6, is adjusted by a horizontal transformer 9, a phasing circuit 10 and an amplitude adjusting circuit 11. More specifically, the horizontal pulse extracted from horizontal transformer 9 is applied to phasing circuit 10 for phasing, then applied to amplitude adjusting circuit 11 for amplitude adjustment and then supplied to addition circuit 7. Addition circuit 7 then adds the high voltage fluctuating component, which includes the horizontal, display face and vertical components which are outputted from amplitude adjusting circuit 6, to the horizontal component corrected by amplitude adjusting circuit 11 and supplies the summed result to an inverting amplifier 8. Inverting amplifier 8 inverts and amplifies the combined signal and supplies the inverted signal to an antenna 12 mounted around the front face of cathode ray tube 3.

Because the tube front face resistance Rp varies greatly for different kinds of cathode ray tubes, the waveform of the electric field radiation and the waveform of the anode voltage are slightly different in phase. Phasing circuits 5 and 10 are thus included to compensate for the difference.

Note that phasing circuit 10 and amplitude adjusting circuit 11 are provided to adjust the horizontal component which has not been sufficiently adjusted by phasing circuits 5 and amplitude adjusting circuit 6. Thus a greater canceling effect than that obtained according to the method of canceling electric fields described in the conventional examples is achieved even if circuits 10 and 11 are omitted.

Figure 5A:
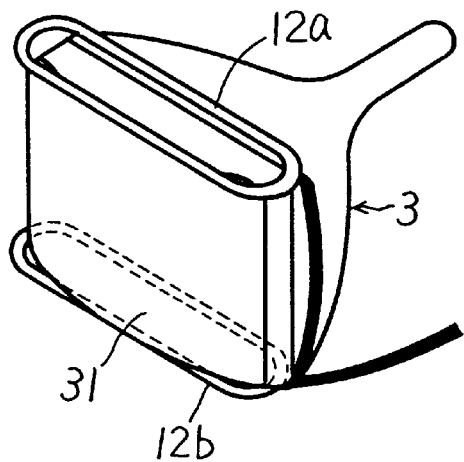
FIGS. 5A to 5C are views showing specific examples of the antenna in FIG. 1.
Figure 5B:
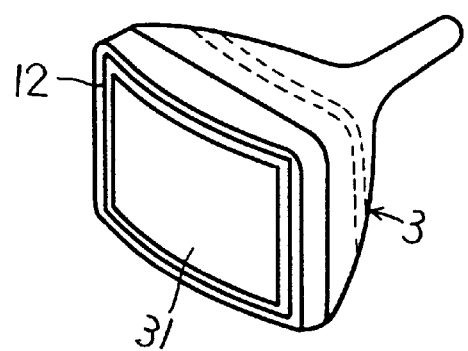
Figure 5C:
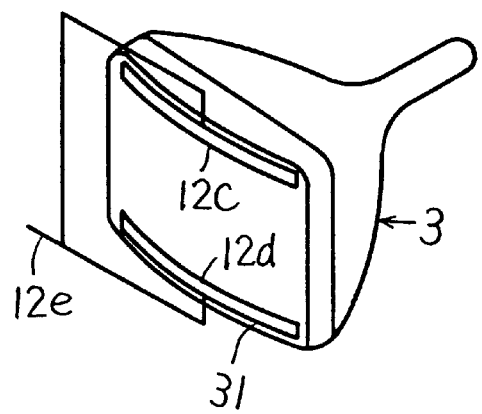

FIGS. 5A to 5C each show a specific example of antenna 12. The antenna is, preferably, an electrode formed from a printed board electrode, a film electrode, a metal plate or the like, namely an electrode with a sufficient area. In FIG. 5A, loop antennas 12a and 12b are mounted opposite to each other along the top and bottom sides of the front face 31 of cathode ray tube 3, and antennas 12a and 12b are provided with output voltage from inverting amplifier 8, shown in FIG. 1, as a canceling voltage.

In FIG. 5B, a loop antenna 12 is mounted along the periphery of the front face 31 of cathode ray tube 3, and antenna 12 is provided with output voltage from inverting amplifier 8. Note that antenna 12 may be mounted at the back of cathode ray tube 3, as denoted in dotted line in FIG. 5B, rather than on the side of front face 31 of cathode ray tube 3.

In FIG. 5C, strip-shaped antennas 12c and 12d are mounted in parallel at the front face 31 of cathode ray tube 3 and are provided with output voltage from inverting amplifier 8 through a lead 12e.

Figure 6:
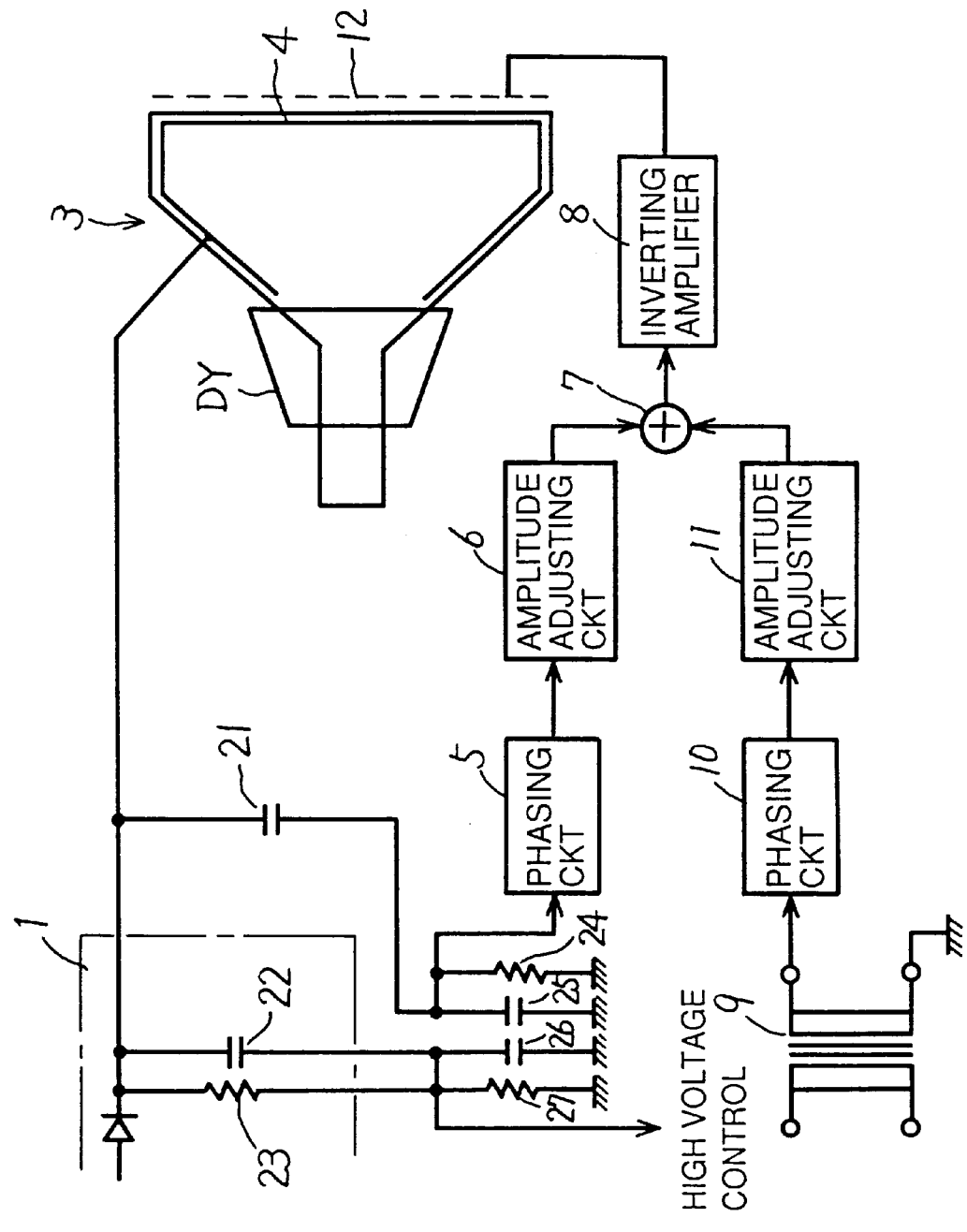
FIG. 6 is a block diagram showing another embodiment of the invention.

FIG. 6 is a block diagram showing another embodiment of the invention. In FIG. 6, capacitor 21 is externally provided, rather than being built into capacitor 2 or flyback transformer 1. In this case, capacitor 21 may be more closely connected to the anode electrode. Thus the influence of parabola voltage for dynamic focusing and noises within the flyback transformer is reduced, and the unwanted electric field radiation can be detected with high accuracy.

Figure 7:
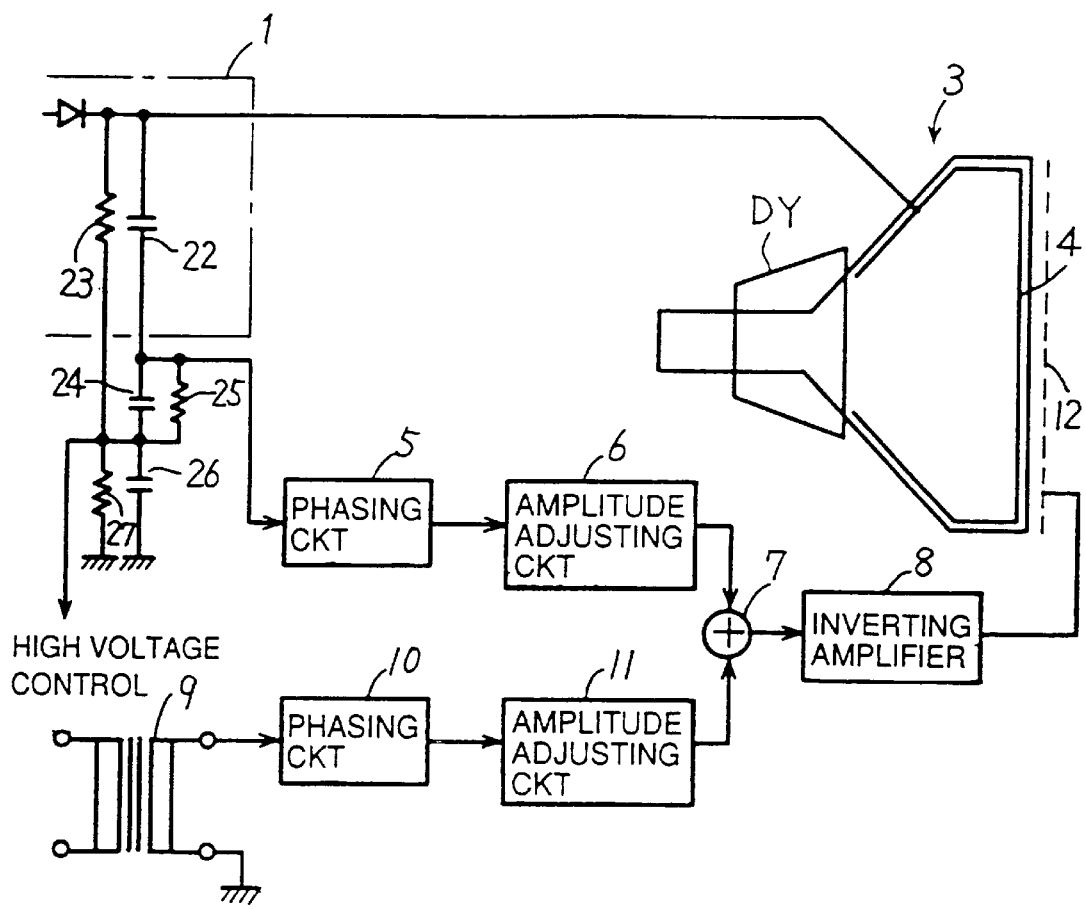
FIG. 7 is a block diagram showing yet another embodiment of the invention.

FIG. 7 is a block diagram showing another embodiment of the invention. In FIG. 7, a single high voltage capacitor 22 is used to detect anode ripple voltage and the detected voltage is applied to phasing circuit 5. More specifically, flyback transformer 1 includes high voltage capacitor 22, one end of which is connected with a parallel arrangement of a capacitor 24 and a resistor 25 and which is further grounded through a capacitor 26. The node connecting high voltage capacitor 22, capacitor 24 and resistor 25 is connected to the input of phasing circuit 5.

Figure 8A:
FIG. 8 is a chart showing detection waveforms that cancel electric fields in the embodiment shown in FIG. 7 and the embodiments shown in FIGS. 1 and 6.

FIG. 8 is a chart showing detection waveforms that cancel electric fields according to the embodiment shown in FIG. 7 and the embodiments shown in FIGS. 1 and 6.

In the example shown in FIG. 7, the anode ripple voltage is detected by the single high voltage capacitor 22, and the total capacitance between anode electrode 4 and ground is reduced, where as the anode ripple voltage instead increases. Because the detection circuit for high voltage control and the detection circuit for canceling electric field partly share a common connection, they interfere with one another, resulting in a phase difference between the waveform of radiation, shown as a in FIG. 8(a) solid line and the detected waveform shown as a dotted line in FIG. 8(a). However, simply detecting such anode ripple voltage may be implemented by the present invention.

Figure 8B:

In addition, as shown in FIG. 8(b), the detection waveform for canceling electric fields in the embodiments of FIGS. 1 and 6 exhibits a smaller phase difference, and thus the embodiments shown in FIGS. 1 and 6 can suppress electric fields radiated from a cathode ray tube more efficiently.

In the embodiments shown in FIGS. 1, 6 and 7, the horizontal component detected by horizontal transformer 9 is applied to addition circuit 7 after phasing and amplitude adjustment by phasing circuits 10 and amplitude adjusting circuit 11. If desired, horizontal transformer 9, phasing circuit 10, amplitude adjusting circuit 11 and addition circuit 7 can be omitted to suppress only the high voltage fluctuating component.

As described above, in the preferred embodiments of the invention, anode ripple voltage of a high voltage output from the flyback transformer is detected by the capacitor, the detected voltage is inverted and amplified to be emitted from the antenna located in proximity to the cathode ray tube. Therefore electric fields radiated from the cathode ray tube are effectively suppressed.

Although the present invention has been described and illustrated in detail, it is clearly understood that the same is only an illustration and example only and is not to be a of limitation, the spirit and scope of the present invention being limited only by the appended claims.

What is claimed is:

1. An apparatus for suppressing electric field radiation from a cathode ray tube, said apparatus comprising:

a flyback transformer outputting high voltage;

a capacitor for detecting anode ripple voltage contained in the high voltage output supplied from said flyback transformer wherein said capacitor includes a first capacitor for outputting high voltage output from said flyback transformer, and a second capacitor connected in parallel with said first capacitor for detecting said anode ripple voltage;

an output circuit for inverting and amplifying the anode ripple voltage detected by said capacitor; and an antenna for radiating an electric field for canceling said electric field radiation to said cathode ray tube based on an output signal from said output circuit.

2. The apparatus recited in claim 1, wherein said first and second capacitors are built in said flyback transformer.

3. The apparatus recited in claim 2, wherein said first capacitor is provided coaxially around said second capacitor.

4. The apparatus recited in claim 1, wherein said first capacitor is provided coaxially around said second capacitor.

5. The apparatus recited in claim 1, wherein said first and second capacitors have a common housing.

* * * * *